United States Patent
Li (10) Patent No.: US 9,983,634 B2
(45) Date of Patent: May 29, 2018

(54) KEYBOARD LIFTING STRUCTURE (71) Applicant: CHICONY ELECTRONICS CO., LTD., New Taipei (TW)

(72) Inventor: Po-Hsin Li, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 278 days.

(21) Appl. No.: 14/884,554

(22) Filed: Oct. 15, 2015

(65) Prior Publication Data
US 2016/0266657 A1 Sep. 15, 2016

(30) Foreign Application Priority Data
Mar. 11, 2015 (TW) .............................. 104203623 U (51) Int. Cl.
*G06F 1/16* (2006.01)
*G06F 3/02* (2006.01)

(52) U.S. Cl.
CPC .......... *G06F 1/1666* (2013.01); *G06F 3/0221* (2013.01)

(58) Field of Classification Search
None
See application file for complete search history.

(56) References Cited

U.S. PATENT DOCUMENTS

| 2002/0071245 A1* | 6/2002 | Hsu | G06F 1/1616 361/679.08 |
| 2011/0234502 A1* | 9/2011 | Yun | G06F 3/016 345/173 |
| 2014/0311880 A1* | 10/2014 | Krumpelman | H01H 13/14 200/5 A |
| 2014/0355188 A1* | 12/2014 | Liu | G06F 1/1662 361/679.11 |
| 2015/0092330 A1* | 4/2015 | Kershek | G06F 1/1666 361/679.09 |
| 2015/0092331 A1* | 4/2015 | Kinoshita | G06F 1/1681 361/679.09 |

* cited by examiner

Primary Examiner — Patrick Edouard
Assistant Examiner — Maheen Javed
(74) Attorney, Agent, or Firm — Muncy, Geissler, Olds & Lowe, P.C.

(57) ABSTRACT

A keyboard lifting structure includes a base, a cover frame covering the base and providing multiple openings, key caps coupled to the base by respective linking mechanisms, driving devices disposed in the base at one side relative to the respective key caps with respective slides thereof respectively abutted against the linking mechanisms of the key caps, and a lifting mechanism disposed between the cover frame and the base for lifting or lowering the cover frame relative to the base and simultaneously causing the driving devices to move the key caps upwardly out of the cover frame or downwardly into the inside of the respective openings of the cover frame.

17 Claims, 11 Drawing Sheets

KEYBOARD LIFTING STRUCTURE

This application claims the priority benefit of Taiwan patent application number 104203623, filed on Mar. 11, 2015.

BACKGROUND OF THE INVENTION

1. Field of the Invention

The present invention relates to keyboard technology and more particularly, to a keyboard lifting structure, which comprises a plurality of driving devices disposed in between a base and a cover frame beneath respective key caps, and a lifting mechanism disposed between the base and the cover frame, and adapted for moving said cover frame vertically relative to said base and simultaneously causing the driving devices to move the respective key caps in or out of respective openings in the cover frame.

2. Description of the Related Art

With fast development of the modern technology, many different kinds of electrical and electronic products have been created and widely used in our daily life, bringing comfort and convenience to people and improving the standard of living of the people. The jobs of word processing, photos and graphics editing, presentations, e-mail, Internet linking, and etc. are quite common in our everyday lives, making the application of computer products become more popular. In various electronic works through a computer system, one must input data through a keyboard, so that the host of the computer system can start processing according to the inputted data. Therefore, a computer keyboard has become an essential tool for the computer jobs. It is now the market trends to design computers and peripheral apparatuses having light, thin, short and small characteristics and enhanced functions, the overall thickness of a computer, more particularly, notebook computer, must be greatly reduced. In consequence, the thickness of computer display screens and keyboards must also be greatly reduced.

For the advantages of being easy to carry and to operate and having no time, place or geographic restrictions, notebook computer has been widely used by people. Sometimes, keycaps might be inadvertently depressed to activate an inadvertent keystroke. In order to prevent this problem, a notebook computer can be equipped with an anti-touch security device that is operable to lift the keyboard cover frame to the elevation around the topmost edges of the key caps to stop the key caps from downward displacement. When the user wishes to use the notebook computer again, the user can operate the anti-touch security device to lower the keyboard cover frame to its former position, allowing clicking of the key caps to input electronic signals. However, the cover frame lifting distance must be larger than the thickness of the key caps so that the key caps can be completely received in respective openings in the keyboard cover frame when the keyboard cover frame is lifted. To achieve this design requirement, the keyboard cover frame must be lifted upwardly from the keyboard base to a distance about 2.0 mm where the keyboard base is kept approximately in a flush manner relative to the topmost edges of the key caps. However, this large lifting distance prohibits reduction of the overall height of the keyboard and causes an increase in the height of the keyboard, making the notebook computer unable to meet the design concept of being light, thin, short and small. Further, this anti-touch security device uses a lifting mechanism to lift the keyboard cover frame to the elevation in flush with the topmost edges of the key caps. Because the lifting mechanism simply acts upon a specific area of the bottom surface of the keyboard cover frame when lifting the keyboard cover frame, the rectangular keyboard cover frame may be not kept in balance, complicating the lifting mechanism lifting operation. An improvement in this regard is needed.

SUMMARY OF THE INVENTION

The present invention has been accomplished to provide a keyboard lifting structure, which uses a lifting mechanism to move a cover frame upwardly or downwardly relative to a base and to simultaneously drive driving devices to move respective key caps downwardly or upwardly relative to the cover frame, enabling the cover frame and the key caps to be lifted or lowered at the same time.

It is therefore the main object of the present invention to provide a keyboard lifting structure, which comprises a base, a cover frame covering the base and providing multiple openings, a plurality of key caps coupled to the base by respective linking mechanisms, a plurality of driving devices disposed in the base and respectively disposed at one side relative to the respective key caps with respective slides thereof respectively abutted against the linking mechanisms, and a lifting mechanism disposed between the cover frame and the base for lifting or lowering the cover frame relative to the base and simultaneously causing the driving devices to move the key caps upwardly out of the cover frame or downwardly into the inside of the respective openings of the cover frame.

Preferably, each driving device comprises a slide disposed in the base and movable transversely relative to the base to drive one respective linking mechanism to move the respective key cap upwardly or downwardly. The slide comprises two first thrust blocks located at two opposite sides thereof and adapted for driving the linking mechanism. Preferably, each linking mechanism further comprises two second thrust blocks disposed at two opposite sides thereof and movable by the respective said first thrust blocks of the respective said slide of the respective said driving device. Further, each first thrust block of each slide of each driving device comprises a beveled surface; each second thrust block comprises a beveled surface abutted against the beveled surface of the respective first thrust block of the respective slide of the respective driving device. Thus, when the cover frame is moved upward by the lifting mechanism relative to the base, the lifting mechanism simultaneously drives the slides of the driving devices to move transversely on the base, causing the beveled surfaces of the first thrust blocks of the respective slides to abut against the beveled surfaces of the second thrust blocks of the respective key caps, and thus, the key caps are lowered into the respective openings of the cover frame, achieving synchronous movement of the key caps and the cover frame, minimizing the lifting distance of the cover frame and the key caps, and enabling the keyboard to exhibit low profile characteristics so as to meet the design concept of being light, thin, short and small.

Preferably, the lifting mechanism comprises a plurality of drive rods. Each drive rod comprises a plurality of V-shaped protruded swinging portions spaced along the length thereof; said cover frame comprises a plurality of receiving grooves located in a bottom surface thereof and adapted for accommodating the drive rods. Each slide further comprises two third thrust blocks disposed at two opposite sides and adapted for driving the linking mechanism. Further, the linking mechanism comprises two axle rods disposed at two opposite sides and facing toward the respective third thrust blocks of the respective key cap. Each slide comprises a protruding block facing toward one V-shaped protruded swinging portion of one respective drive rod and drivable by the respective V-shaped protruded swinging portion of the respective drive rod to move the respective slide transversely relative to the base. Thus, the cover frame and the key caps can be synchronously lifted or lowered relative to the base, shortening the lifting distance of the cover frame relative to the base and enabling the keyboard to exhibit low profile characteristics and to further meet the design concept of being light, thin, short and small.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Referring to FIGS. 1-5, an elevational view of a keyboard lifting structure in accordance with the present invention, an exploded view of the keyboard lifting structure, a sectional side view of the keyboard lifting structure, a schematic sectional side view illustrating the cover frame lifted and a schematic sectional side view illustrating the cover frame lowered are shown. The keyboard lifting structure comprises a base 1, a cover frame 2, a plurality of key caps 3 and a plurality of driving device 4.

Figure 1:
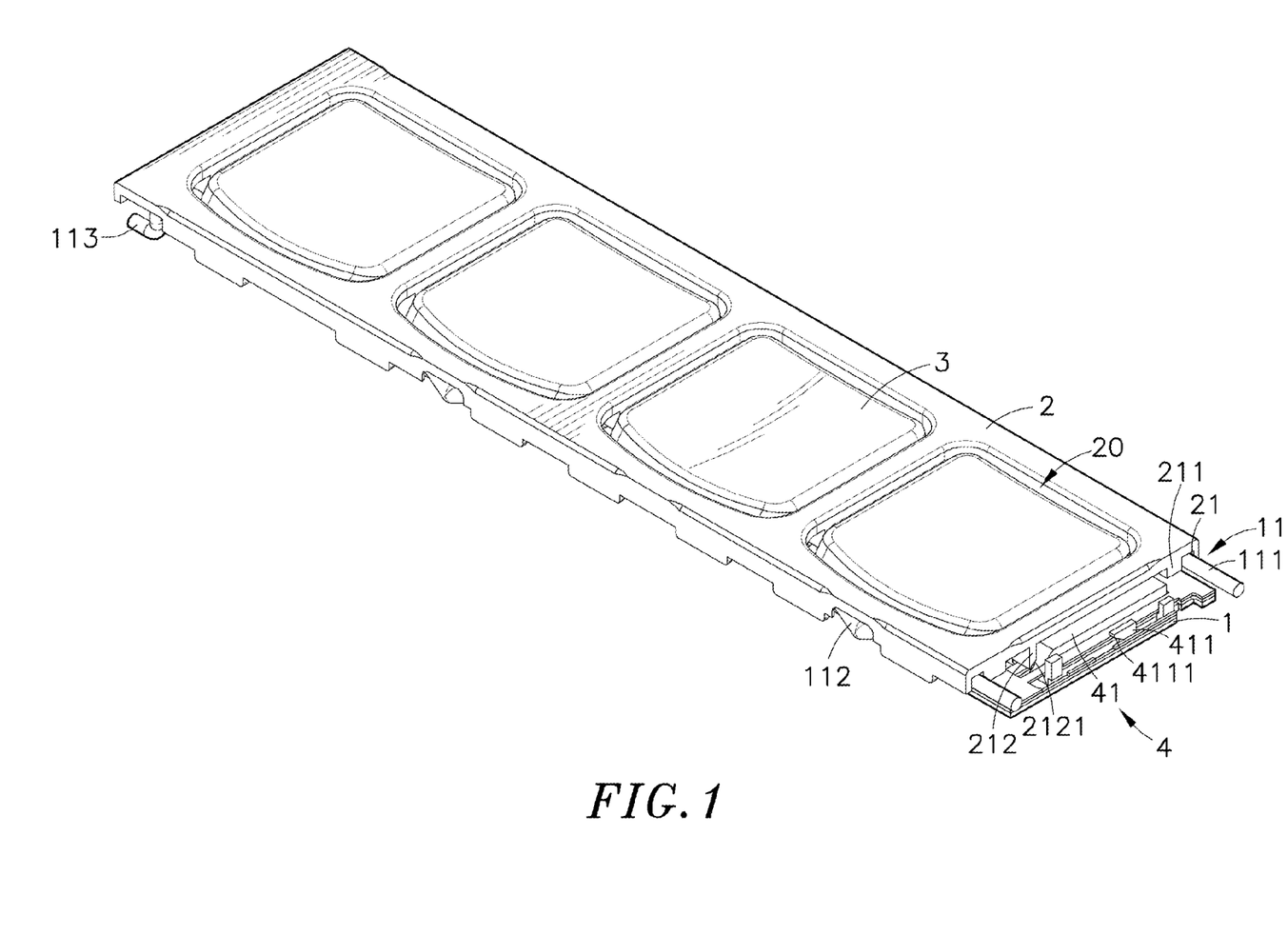
FIG. 1 is an elevational view of a keyboard lifting structure in accordance with the present invention.
Figure 2:
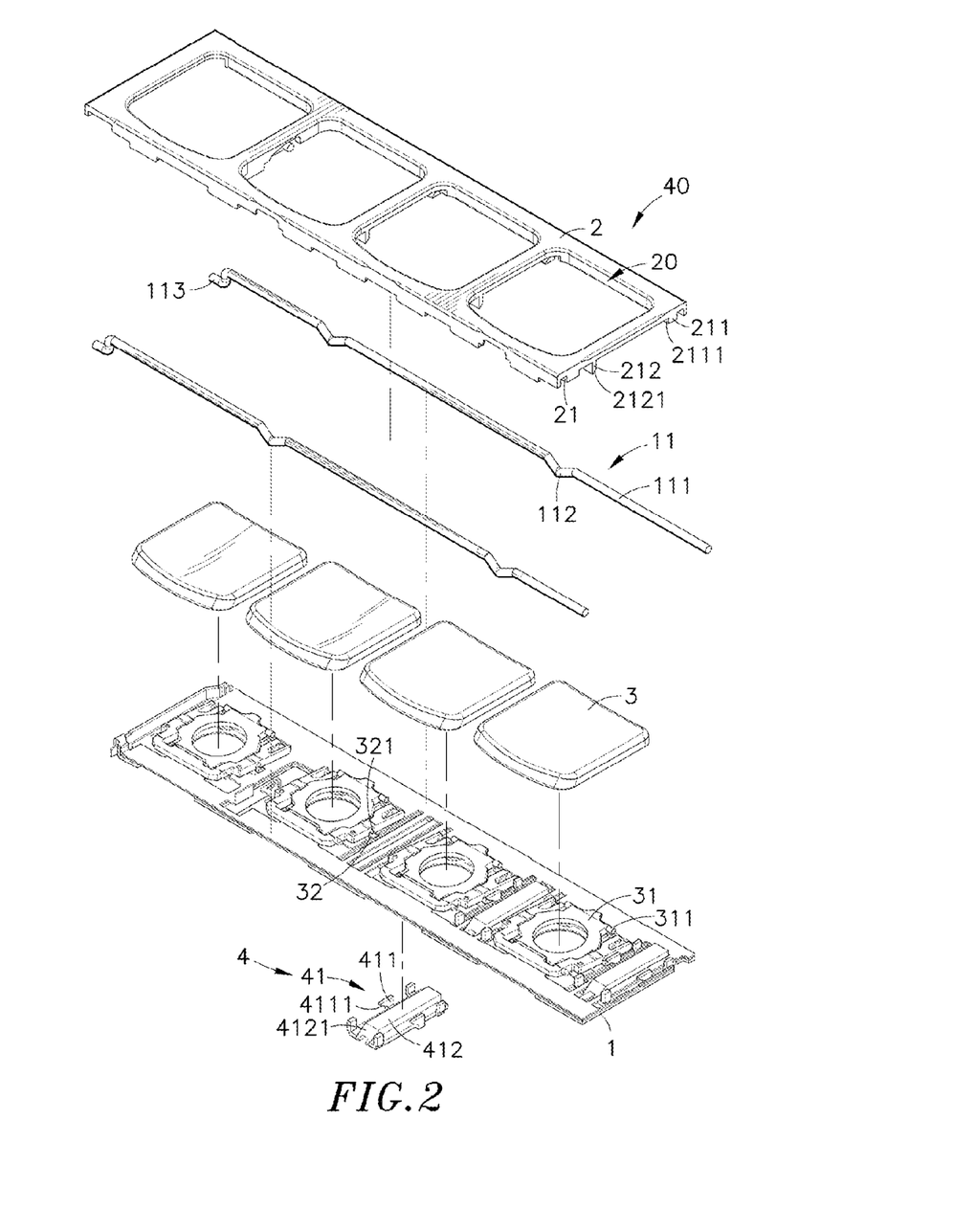
FIG. 2 is an exploded view of the keyboard lifting structure in accordance with the present invention.
Figure 3:
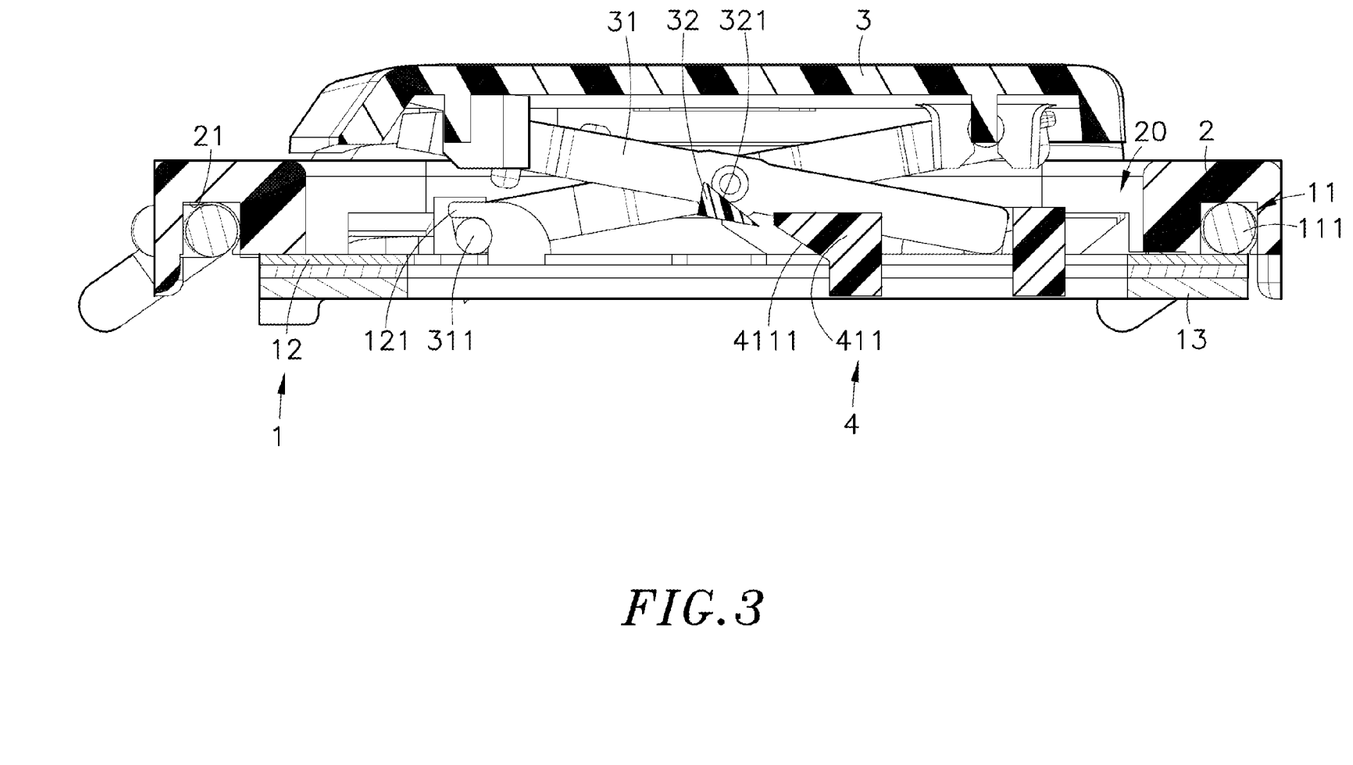
FIG. 3 is a sectional side view of the keyboard lifting structure in accordance with the present invention.

The cover frame 2 and the key caps 3 are disposed at the top side of the base 1. A lifting mechanism 11 is disposed between the base 1 and the cover frame 2. The lifting mechanism 11 comprises a plurality of, for example, two drive rods 111 symmetrically arranged. Each drive rod 111 comprises a plurality of protruded swinging portions 112 spaced along the length thereof. In this embodiment, the protruded swinging portions 112 are V-shaped bending portions of the drive rod. The base 1 is a plate member adapted for carrying the cover frame 2 and the key caps 3. In this embodiment, the base 1 comprises a support plate 13, and a substrate 12 stacked on the support plate 13. The substrate 12 comprises multiple sets of connecting member 121 raised from the top surface thereof. Preferably, the driving devices 4 are arranged between the support plate 13 and the substrate 12, however, this arrangement is not a limitation.

Figure 5:
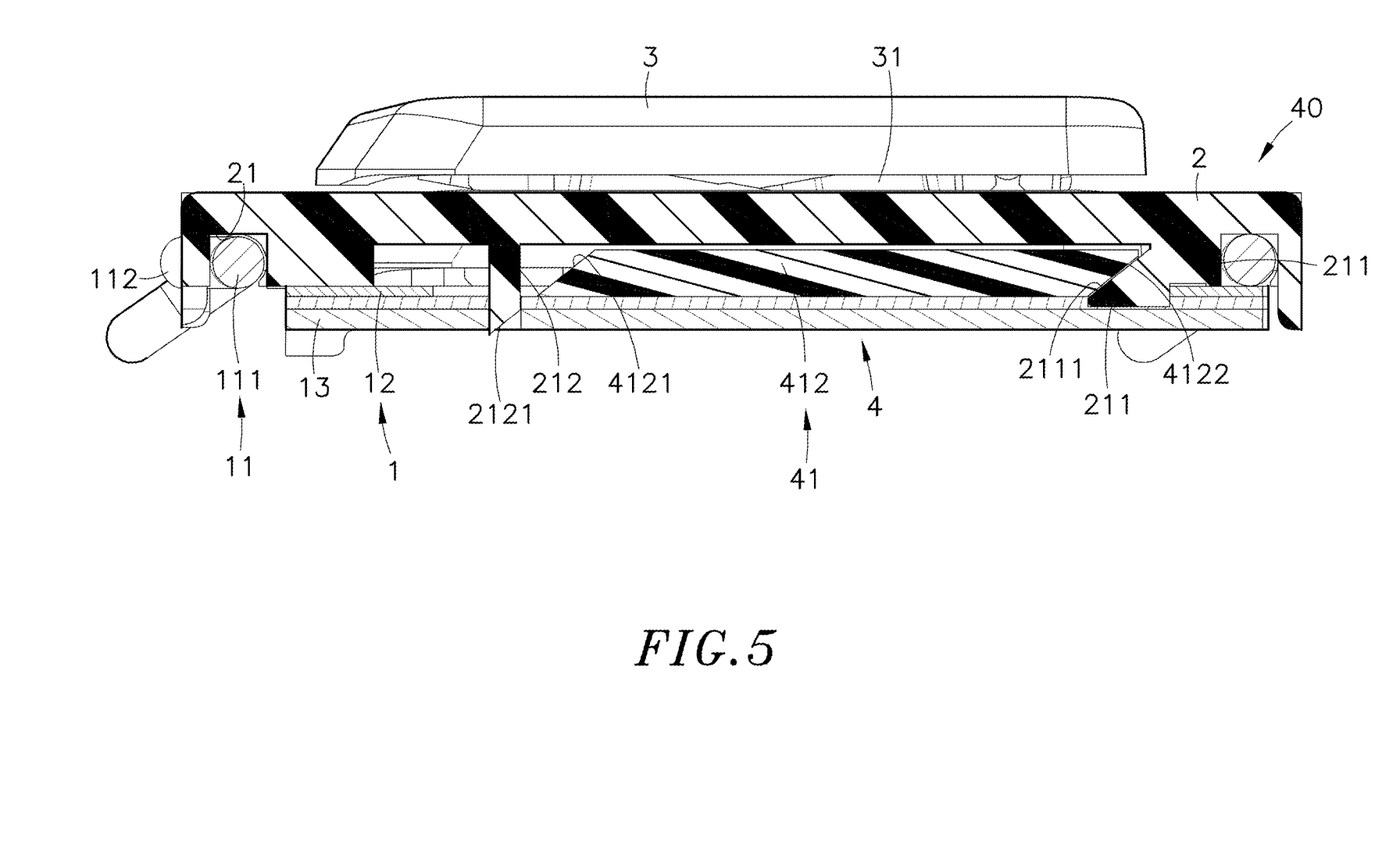
FIG. 5 is a schematic sectional side view of the invention, illustrating the cover frame lowered.
Figure 6:
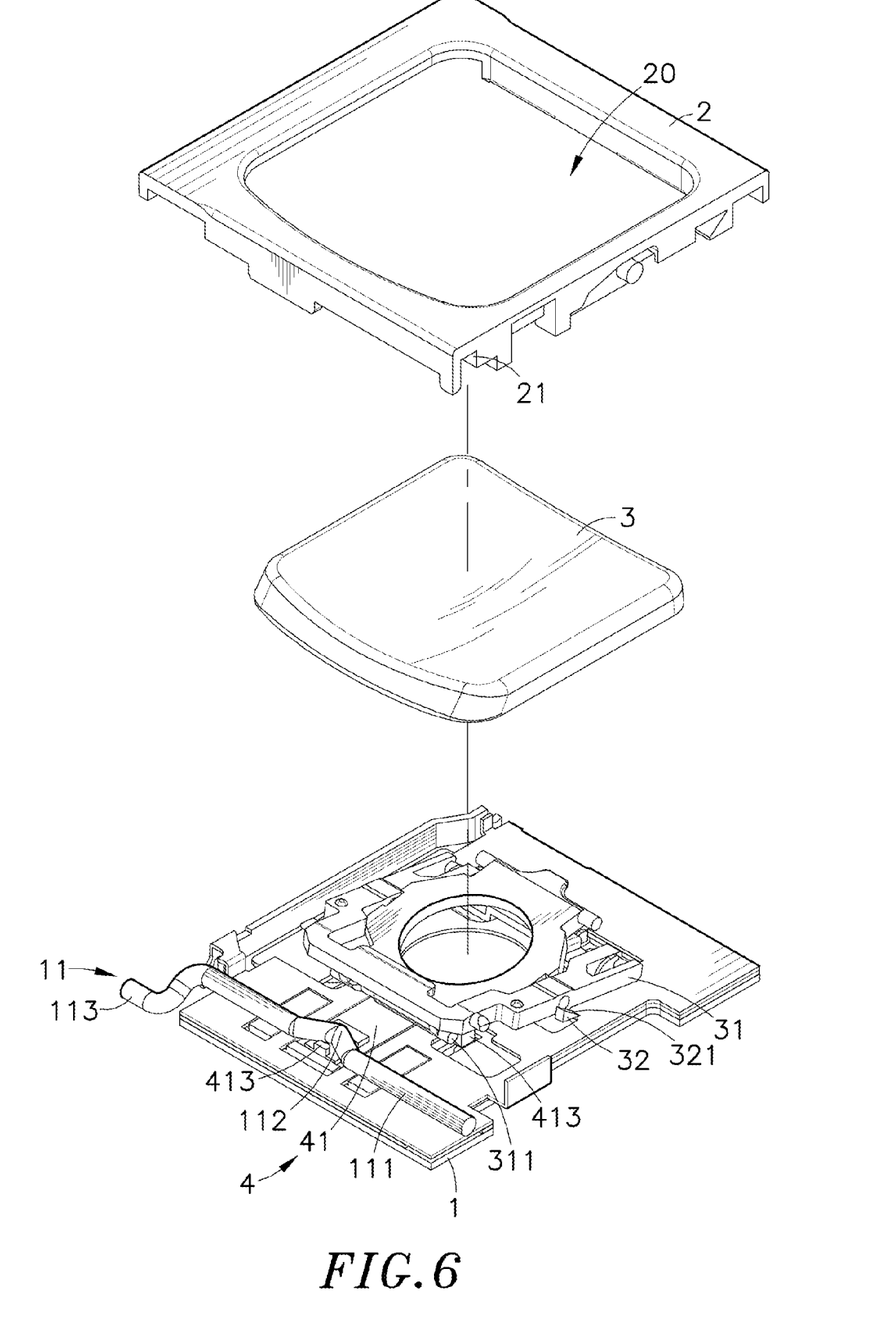
FIG. 6 is an exploded view of a part of the keyboard lifting structure before driving of the lifting mechanism.
Figure 7:
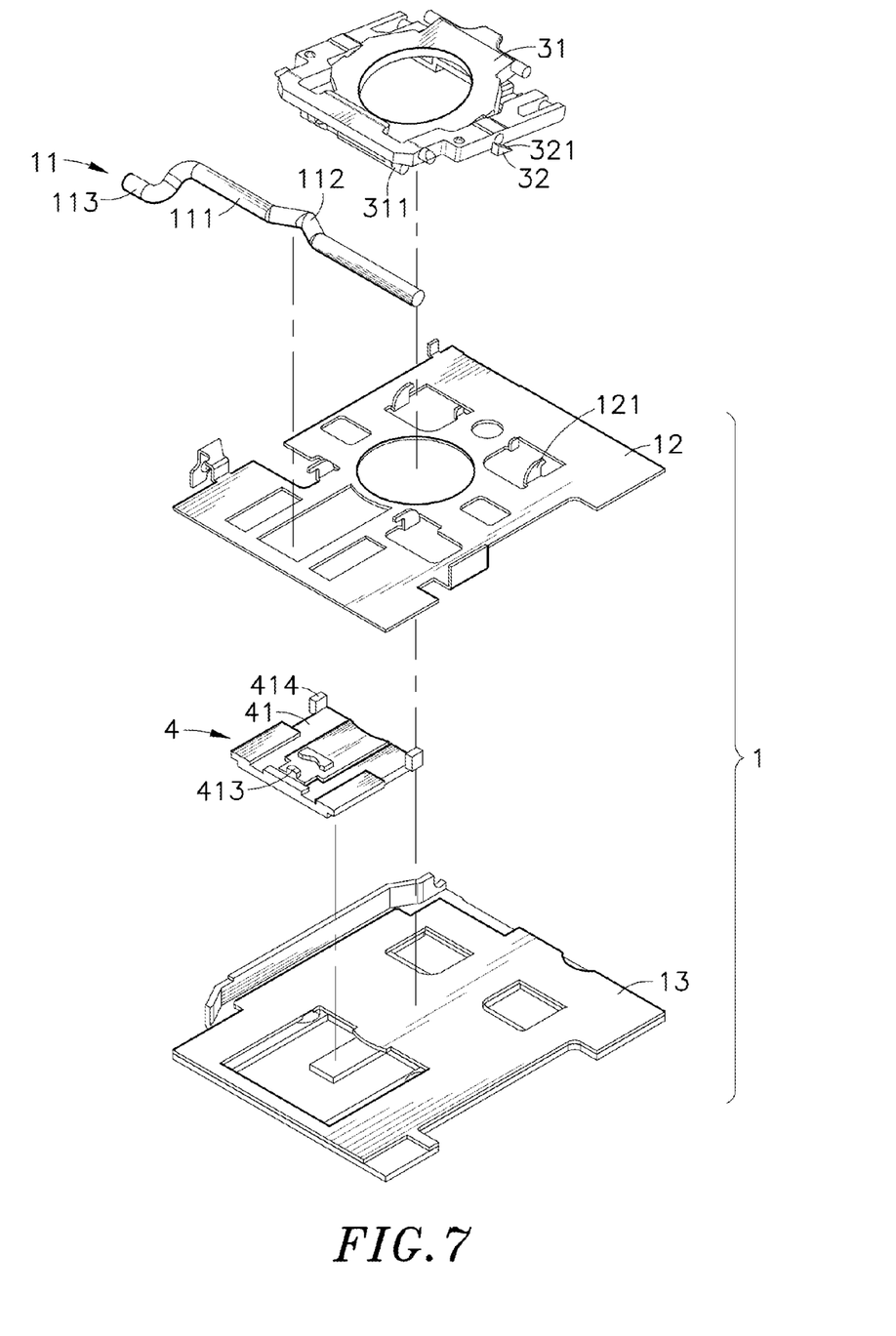
FIG. 7 is an exploded view of another part of the keyboard lifting structure before driving of the lifting mechanism.
Figure 8:
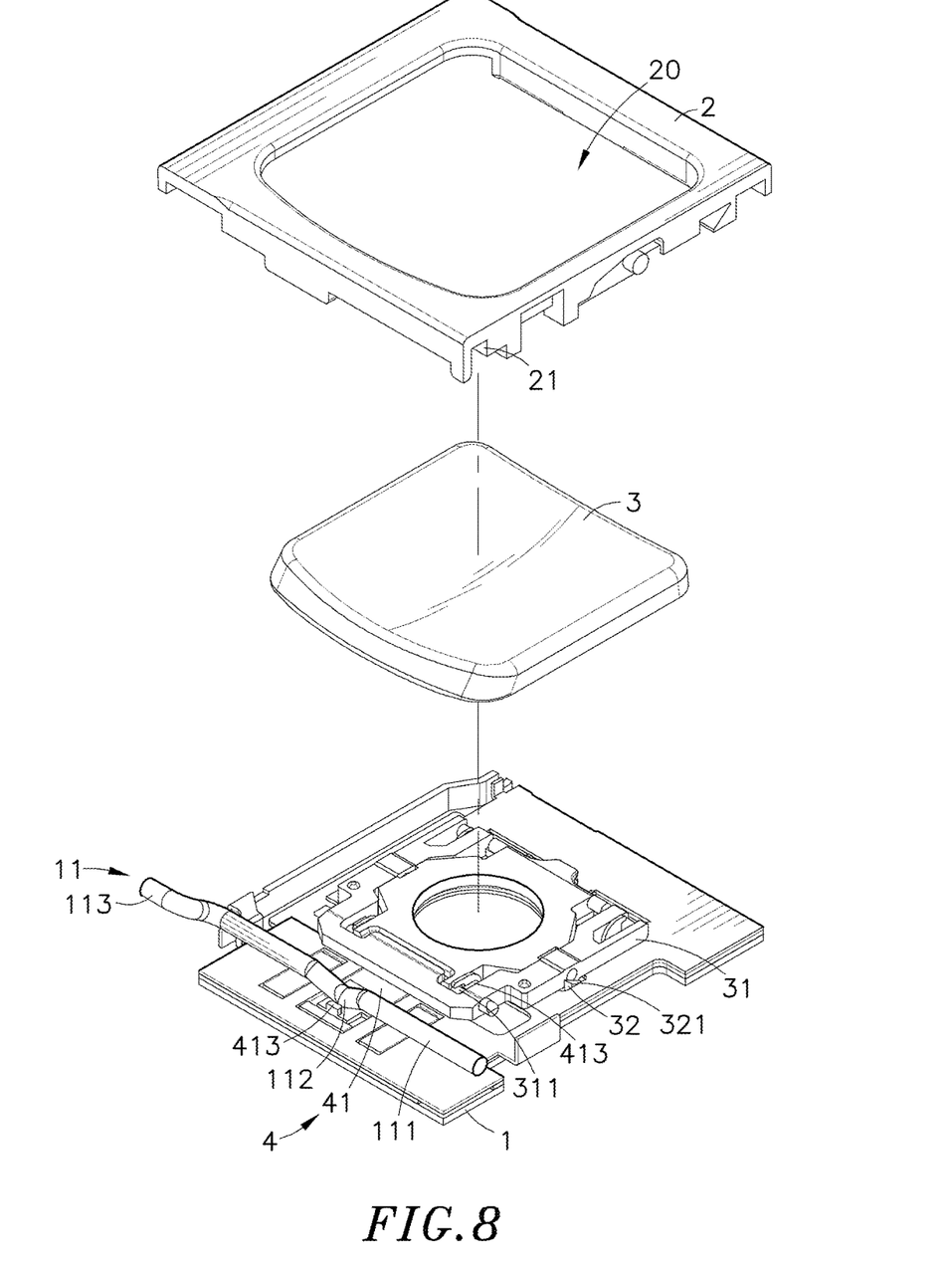
FIG. 8 is an exploded view of a part of the keyboard lifting structure after driving of the lifting mechanism.
Figure 9:
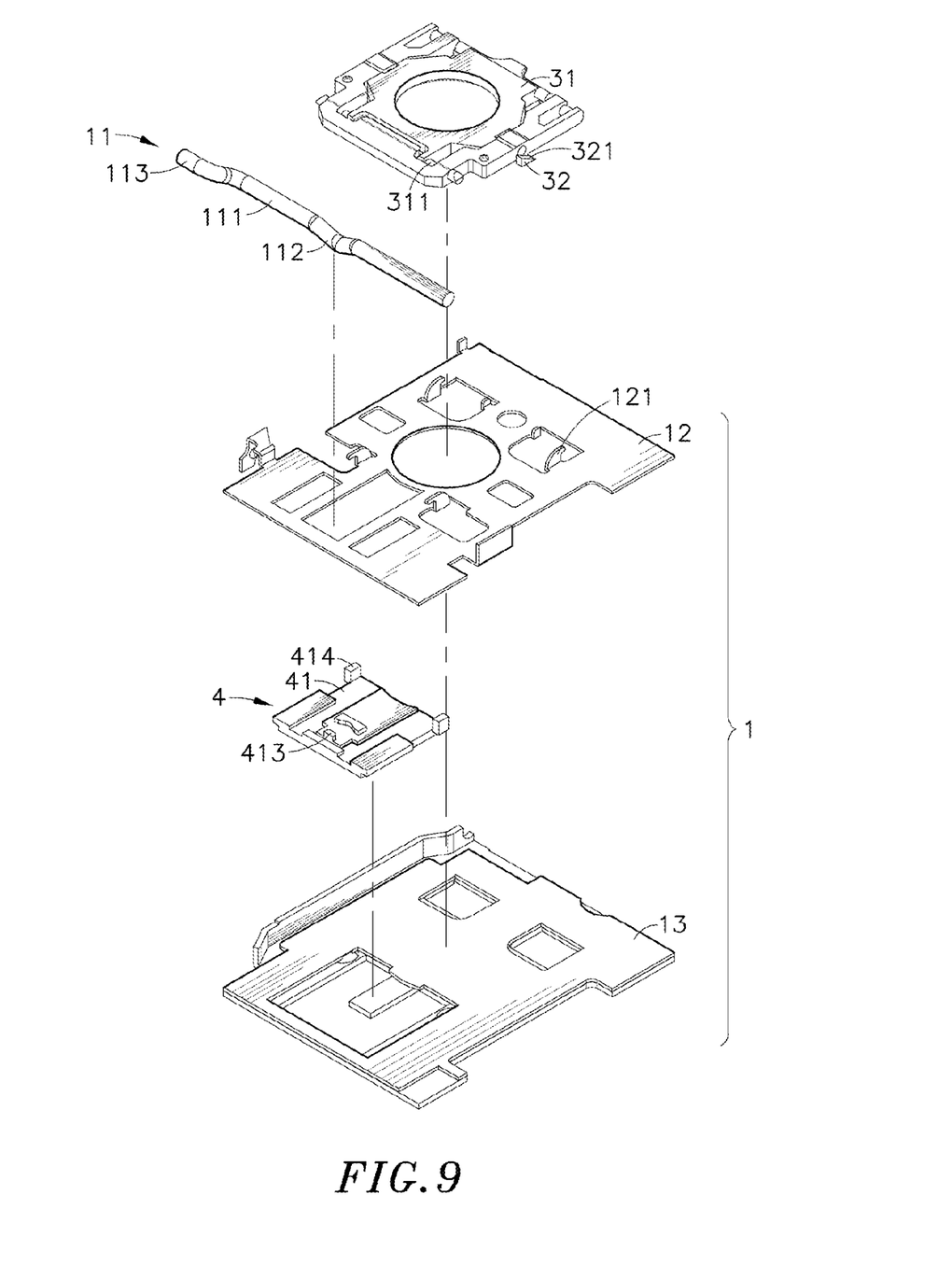
FIG. 9 is an exploded view of another part of the keyboard lifting structure after driving of the lifting mechanism.
Figure 10:
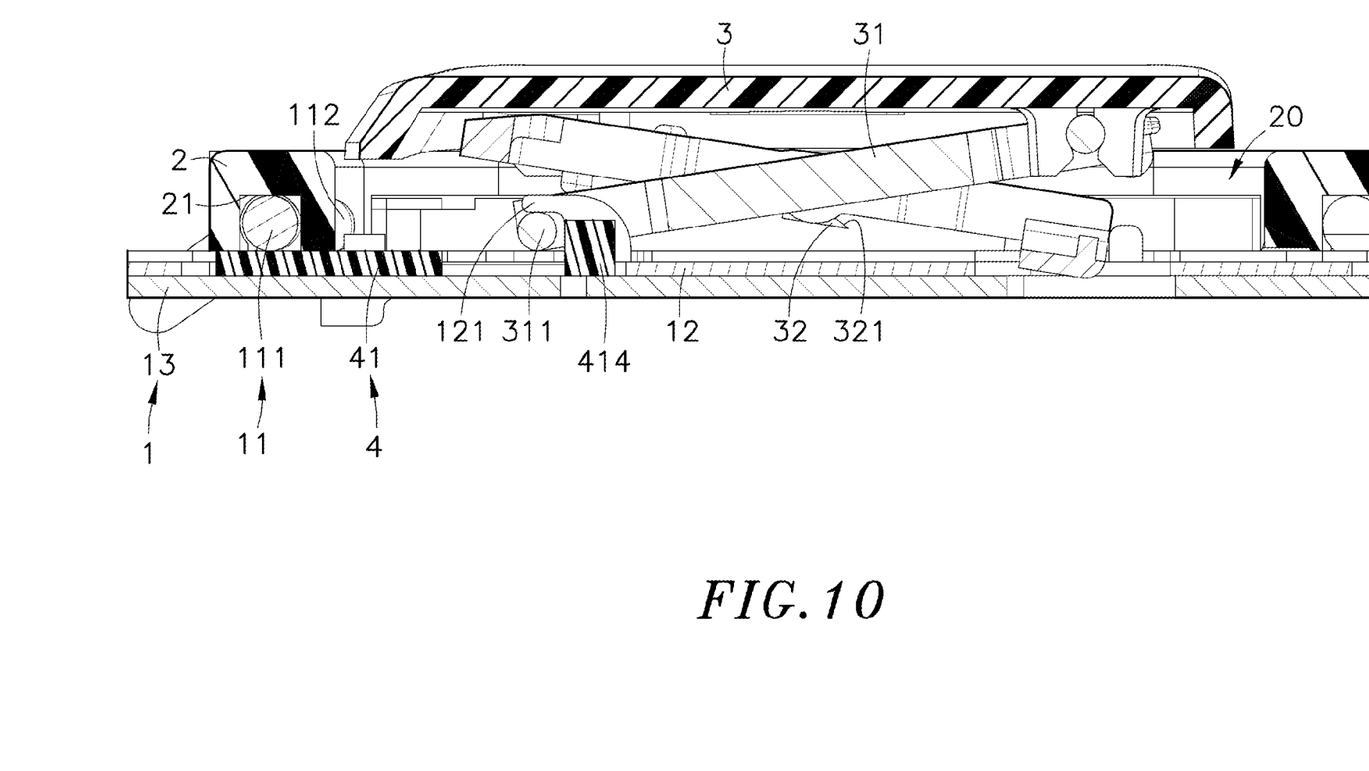
FIG. 10 is a sectional side view of the invention illustrating the cover frame lowered.
Figure 11:
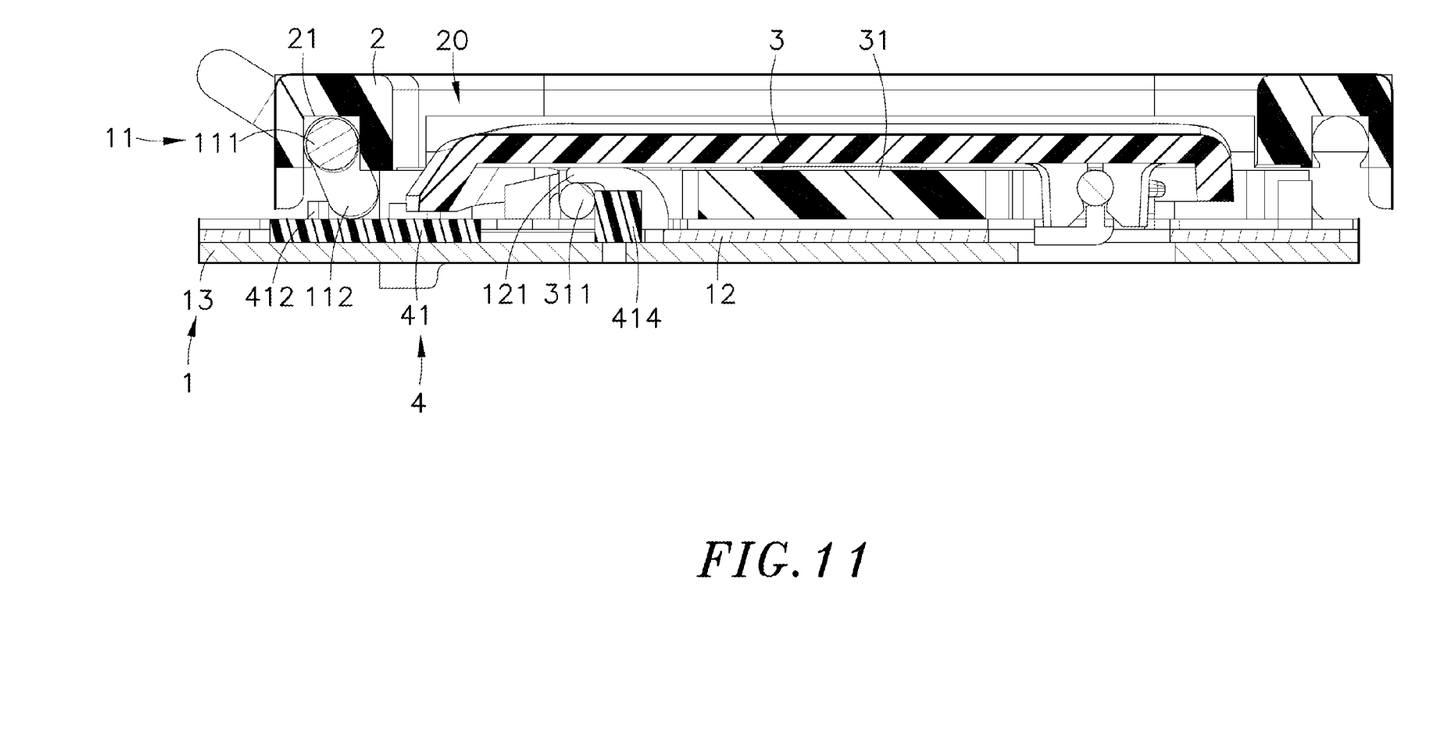
FIG. 11 a sectional side view of the invention, illustrating the cover frame lifted.

The cover frame 2 comprises a plurality of openings 20 cut through opposing top and bottom surfaces thereof, two receiving grooves 21 bilaterally located in the bottom surface at two opposite lateral sides relative to the openings 20 for accommodating the drive rods 111 of the lifting mechanism 11 in such a manner that the protruded swinging portions 112 of the drive rods 111 are disposed outside the receiving grooves 21 and swingable to adjust the distance between the cover frame 2 and the substrate 12. Further, the cover frame 2 comprises a plurality of force-applying unit 40 disposed at the bottom surface thereof corresponding to the driving devices 4, as shown in FIG. 5. In this embodiment, each force-applying unit 40 comprises a push block 211 and a pressure block 212 downwardly protruded from the bottom surface of the cover frame 2 for driving the respective driving device 4. The push block 211 and the pressure block 212 each has a beveled structure facing toward the respective driving device 4. Preferably, the push block 211 provides a beveled lifting surface portion 2111 at an inner lateral side thereof; the pressure block 212 provides a beveled pressure surface portion 2121 at a bottom side thereof.

The key caps 3 are respectively disposed in the openings 20 of the cover frame 2. Each key cap 3 is coupled to a linking mechanism 31 (scissors linkage, V-shaped linkage or the like) operably disposed at the bottom side thereof. By means of the linking mechanism 31, each key cap 3 is coupled to one respective set of connecting member 121 of the substrate 12 of the base 1 and movable up and down in the respective opening 20 of the cover frame 2. In this embodiment, each linking mechanism 31 further comprises two second thrust blocks 32 disposed at two opposite sides thereof. Each second thrust block 32 has a beveled surface 321.

Each driving device 4 comprises a slide 41 disposed in the base 1. In this embodiment, the slide 41 is disposed between the support plate 13 and the substrate 12 at a bottom side in the gap between two adjacent key caps 3. The slide 41 comprises two first thrust blocks 411 disposed at two opposite sides. Each first thrust block 411 has a beveled surface 4111 mating with the beveled surface 321 of one respective second thrust block 32. The slide 41 further comprises a convex portion 412 raised from the top surface thereof between the two first thrust blocks 411. The convex portion 412 has two beveled surfaces 4121, 4122 respectively disposed at two opposite ends thereof corresponding to the push block 211 and pressure block 212 of the cover frame 2.

Figure 4:
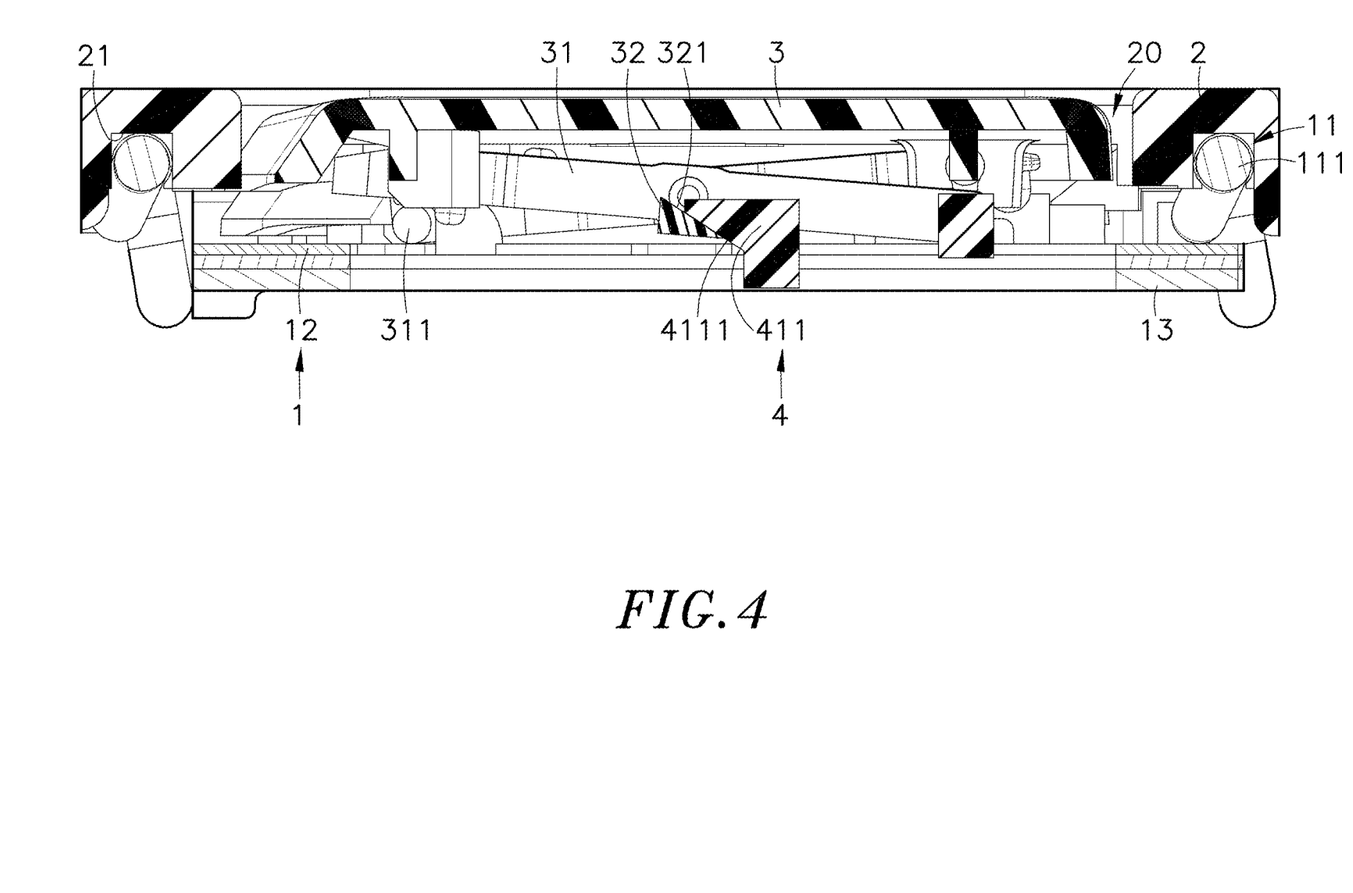
FIG. 4 is a schematic sectional side view of the invention, illustrating the cover frame lifted.

When the protruded swinging portions 112 of the drive rods 111 of the lifting mechanism 11 are biased to a vertical position (as shown in FIG. 4), the protruded swinging portions 112 push the cover frame 2 upwardly away from the base 1. During upward movement of the cover frame 2, the beveled lifting surface portion 2111 of the push block 211 is forced against the beveled surfaces 4122 of slides 41 of the driving devices 4, moving the slides 41 transversely relative to the base 1 in one direction. At this time, the beveled surfaces 4111 of the first thrust blocks 411 of the slides 41 are forced against the beveled surfaces 321 of the second thrust blocks 32 of the key caps 3. Thus, when the drive rods 111 lift the cover frame 2, the second thrust blocks 32 of the linking mechanism 31 are pressed by the first thrust blocks 411 of the slides 41. The key caps 3 are lowered by the linking mechanism 31 and therefore, the cover frame 2 can be lifted and the key caps 3 can be lowered simultaneously.

When the protruded swinging portions 112 of the drive rods 111 are swung to a horizontal position (as shown in FIG. 5), the cover frame 2 is lowered with the protruded swinging portions 112 toward the base 1. During downward movement of the cover frame 2, the beveled pressure surface portion 2121 of the pressure block 212 are abutted against the beveled surfaces 4121 of the convex portions 412 of the slides 41, moving the slides 41 transversely relative to the base 1 in the reversed direction. At this time, the beveled surfaces 4111 of the first thrust blocks 411 of the slides 41 are moved away from the beveled surfaces 321 of the second thrust blocks 32. The second thrust blocks 32 of the of the linking mechanism 31 are released from the constraint of the first thrust blocks 411 of the slides 41 so that the key caps 3 are forced by elastic member (not shown) to protrude over the top side of the respective openings 20 of the cover frame 2, and thus, the key caps 3 are lifted and the cover frame 2 is lowered simultaneously. Because the key caps 3 and the cover frame 2 can be moved synchronously in reversed directions, the lifting distance of the cover frame 2 can be minimized. Thus, the thickness (vertical height) of the base 1, the cover frame 2 and the key caps 3 can be greatly reduced, enabling the keyboard to exhibit low profile characteristics so as to meet the design concept of being light, thin, short and small.

Referring to FIGS. 6-11, an exploded view of a part of the keyboard lifting structure before driving of the lifting mechanism, an exploded view of another part of the keyboard lifting structure before driving of the lifting mechanism, an exploded view of a part of the keyboard lifting structure after driving of the lifting mechanism, an exploded view of another part of the keyboard lifting structure after driving of the lifting mechanism, a sectional side view of the keyboard lifting structure after the cover frame lowered and a sectional side view of the keyboard lifting structure after the cover frame lifted are shown. As illustrated, the driving devices 4 are disposed in the base 1 between the support plate 13 and the substrate 12 and respectively disposed at the bottom side in the gap between each two adjacent key caps 3; the slides 41 of the driving device 4 are disposed in the base 1; the lifting mechanism 11 can be disposed between the base 1 and the cover frame 2, in this embodiment, the lifting mechanism 11 is disposed on the bottom surface of the cover frame 2; the drive rods 111 of the lifting mechanism 11 are respectively accommodated in the respective receiving grooves 21 in the bottom surface of the cover frame 2 with the V-shaped protruded swinging portions 112 facing toward the protruding blocks 413 of the respective slides 41 so that the protruding blocks 413 can be forced by the respective V-shaped protruded swinging portions 112; each drive rod 111 has an operating end portion 113 and operable to rotate the respective drive rods 111 and to further force the respective protruded swinging portions 112 against the respective protruding blocks 413 of the respective slides 41, and thus, the drive rods 111 can be forced against the respective receiving grooves 21 of the cover frame 2 to move the cover frame 2 upwardly or downwardly, and the slides 41 can be simultaneously and transversely moved in the base 1.

In this embodiment, each slide 41 further comprises two third thrust blocks 414 disposed at two opposite sides; the linking mechanism 31 coupled to each key cap 3 comprises two axle rods 311 respectively connected to the connecting member 121 and abutted against the third thrust blocks 414 of the respective slide 41. By means of forcing the respective third thrust blocks 414 of each slide 41 against the respective axle rods 311 of the linking mechanism 31, each slide 41 can drive the respective linking mechanism 31 to lift or lower the respective key cap 3. Thus, through the drive rods 111 and the slides 41, the key caps 3 and the cover frame 2 can be simultaneously lifted or lowered relative to the base 1, and, the lifting distance of the cover frame 2 and the key caps 3 in the base 1 can be minimized. It is to be noted that the slide 41 can drive the linking mechanism 31 selectively by forcing the third thrust blocks 414 against the respective axle rods 311, or forcing the first thrust blocks 411 (see also FIG. 4) against the respective second thrust blocks 32, or using the third thrust blocks 414 to drive the linking mechanisms 31.

It is to be noted the embodiment described above is simply for easy understanding of the spirit and concept of the invention but not intended for use to limit the scope of the invention. In conclusion, the invention provides a keyboard lifting structure, which comprises a base, a cover frame covering the base and providing multiple openings, a plurality of key caps respectively coupled to the base by respective linking mechanisms, a plurality of driving devices operably disposed in the base and movable transversely in said base for moving the key caps, and a lifting mechanism disposed between the base and the cover frame for lifting or lowering the cover frame relative to the base and simultaneously causing the driving devices to move key caps upwardly or downwardly relative to the cover frame. Thus, the cover frame and the key caps can be synchronously lifted or lowered relative to the base, shortening the lifting distance of the cover frame relative to the base. The invention enables the thickness of the keyboard to be minimized, meeting the design concept of being light, thin, short and small.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:
1. A keyboard lifting structure, comprising
a base;
a cover frame disposed on a top side of said base, said cover frame comprising a plurality of openings;
a lifting mechanism disposed between said base and said cover frame and adapted for moving said cover frame upwardly or downwardly relative to said base;
a plurality of key caps respectively disposed in said openings of said cover frame;
a plurality of linking mechanisms respectively coupled between said key caps and said base, said key caps being moved up and down in the respective said openings by said linking mechanisms; and
a plurality of driving devices operably disposed in said base and movable transversely in said base for moving said key caps, each said driving device comprising a slide disposed in said base and movable transversely relative to said base to drive one respective said linking mechanism to move the respective said key cap;
wherein when said lifting mechanism are driven to move said cover frame upwardly relative to said base, said lifting mechanism simultaneously drive said driving devices to move said key caps downwardly; and
when said lifting mechanism are driven to move said cover frame downwardly relative to said base, said lifting mechanism simultaneously drive said driving devices to move said key caps upwardly.

2. The keyboard lifting structure as claimed in claim 1, wherein said cover frame comprises a plurality of force-applying units disposed corresponding to the respective said driving devices and adapted for driving said driving devices to move the respective said key caps synchronously when said lifting mechanism moves said cover frame.

3. The keyboard lifting structure as claimed in claim 2, wherein said lifting mechanism comprises a plurality of drive rods, each said drive rod comprising a plurality of V-shaped protruded swinging portions spaced along the length thereof; said cover frame comprises a plurality of receiving grooves located in a bottom surface thereof and adapted for accommodating said drive rods.

4. The keyboard lifting structure as claimed in claim 1, wherein said slide of each said driving device comprises two first thrust blocks located at two opposite sides thereof and adapted for driving said linking mechanism.

5. The keyboard lifting structure as claimed in claim 4, wherein said linking mechanism of each said key cap comprises two axle rods respectively abutted against said first thrust blocks of the respective said slide of the respective said driving device.

6. The keyboard lifting structure as claimed in claim 4, wherein each said linking mechanism further comprises two second thrust blocks disposed at two opposite sides thereof and movable by the respective said first thrust blocks of the respective said slide of the respective said driving device.

7. The keyboard lifting structure as claimed in claim 6, wherein each said first thrust block comprises a beveled surface; each said second thrust block comprises a beveled surface mating with the beveled surface of the respective said first thrust block.

8. The keyboard lifting structure as claimed in claim 1, wherein each said force-applying unit of said cover frame comprises a push block and a pressure block bilaterally disposed at a bottom side of said cover frame and adapted for moving one respective said slide.

9. The keyboard lifting structure as claimed in claim 8, wherein each said slide comprises a convex portion raised from a top side between said first thrust blocks thereof, and two beveled surfaces respectively located at two opposite ends of said convex portion; said cover frame comprises a plurality of said push blocks and a plurality of said pressure blocks respectively mating with the beveled surfaces of said convex portions of said slides.

10. The keyboard lifting structure as claimed in claim 9, wherein when said cover frame is lifted relative to said base, the beveled surface of the said push block of each said force-applying unit of said cover frame is forced against one beveled surface of said convex portion of the respective said slide to move the respective said slide transversely relative to said base in one direction; when said cover frame is lowered, the beveled surface of said pressure block is forced against the other beveled surface of said convex portion of the respective said slide to move the respective said slide transversely relative to said base in the reversed direction.

11. The keyboard lifting structure as claimed in claim 1, wherein when said lifting mechanism moves said cover frame upwardly or downwardly relative to said base, said lifting mechanism simultaneously drive said driving devices to move said key caps downwardly or upwardly relative to said cover frame.

12. The keyboard lifting structure as claimed in claim 11, wherein said lifting mechanism comprises a plurality of said drive rods, each said drive rod comprising a plurality of said V-shaped protruded swinging portions spaced along the length thereof; said cover frame comprises a plurality of said receiving grooves located in a bottom surface thereof and adapted for accommodating said drive rods.

13. The keyboard lifting structure as claimed in claim 12, wherein each said slide comprises a protruding block facing toward one said V-shaped protruded swinging portion of one respective said drive rod and drivable by the respective said V-shaped protruded swinging portion of the respective said drive rod to move the respective said slide transversely relative to said base.

14. The keyboard lifting structure as claimed in claim 11, wherein each said slide further comprises two third thrust blocks disposed at two opposite sides and adapted for driving said linking mechanism of the respective said key cap.

15. The keyboard lifting structure as claimed in claim 14, wherein said linking mechanism of each said key cap comprises two said axle rods disposed at two opposite sides and facing toward the respective said third thrust blocks of the respective said key cap.

16. The keyboard lifting structure as claimed in claim 14, wherein each said driving device comprises said slide disposed in said base and movable transversely relative to said base to drive one respective said linking mechanism to move the respective said key cap upwardly or downwardly, said slide comprising two said first thrust blocks; each said key cap further comprises two said second thrust blocks disposed at two opposite sides relative to the linking mechanism thereof and movable by the respective said first thrust blocks of the respective said slide of the respective said driving device.

17. The keyboard lifting structure as claimed in claim 1, wherein said base comprises a support plate and a substrate stacked on said support plate; said driving devices are disposed between said support plate and said substrate.

* * * * *